(No Model.)
R. M. THOMPSON.
COMBINED HORSESHOEING HAMMER, NAIL CLINCHER, EXTRACTOR, &c.
No. 244,688. Patented July 19, 1881.
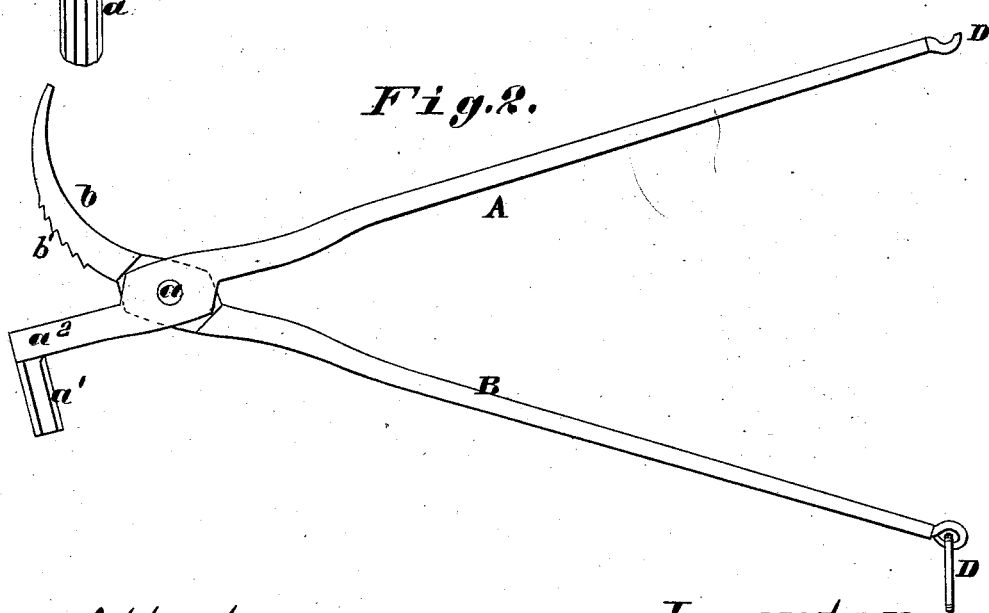

UNITED STATES PATENT OFFICE.

RECTOR M. THOMPSON, OF IBERIA, MISSOURI.

COMBINED HORSESHOEING-HAMMER, NAIL CLINCHER, EXTRACTOR, &c.

SPECIFICATION forming part of Letters Patent No. 244,688, dated July 19, 1881.

Application filed May 24, 1881. (No model.)

*To all whom it may concern:*

Be it known that I, RECTOR M. THOMPSON, of Iberia, in the county of Miller and State of Missouri, have invented a certain new and useful Improvement in Combined Horseshoeing-Hammer and Nail Clincher and Extractor, &c., of which the following is a full, clear, and exact description, reference being had to the accompanying drawings, forming part of this specification.

My device consists in two handles pivoted together near one end, as shown, and being provided, the one with a projection for driving nails and the other with a segmental jaw having teeth on its convex face, and having its nose slotted in the form of a common claw-hammer, all of which will more fully appear hereinafter when I come to describe the invention, referring to the drawings, in which—

Figure 1 is a perspective view, showing my instrument in position for driving nails or extracting them or twisting off their ends, and Fig. 2 is a side view, showing the instrument in position for clinching the nail upon the horse's hoof.

A B are the handles, pivoted together by a rivet, $a$. To the handle A is secured a projection, $a'$, for driving nails, or the projection $a'$ may be part of the handle bent into the proper shape. The corresponding end, $b$, of the handle B to that $a^2$ of the handle A is turned up to form a segment or part of a circle, which is serrated or formed with teeth $b'$ on its convex surface, its nose being slotted at $b^2$ for extracting nails and twisting off their ends.

When the device is used for driving or extracting nails the hand end of the handles may be connected together by a link, D, secured to one handle and engaging over a catch, D', on the other. When the device is used for clinching the nail upon the horse's hoof it is opened into the position shown in Fig. 2, the end $a^2$ being placed under the shoe and the end $b$ upon the point of the nail for clinching it. The claws may be used for twisting off the ends of the nails where they project too far through the hoof, which is generally the case, as well as for extracting nails.

Having thus described my invention, the following is what I claim as new therein and desire to secure by Letters Patent:

1. A blacksmith's tool consisting of handles pivoted together, and provided, respectively, at one end, the one with a projection for driving nails, and the other with a convex surface notched or serrated, substantially as shown and described, and for the purpose set forth.

2. The blacksmith's tool consisting of handles pivoted together and provided, respectively, at one end, the one with a projection for driving nails, and the other with a convex surface notched or serrated, substantially as and for the purpose described, and being provided with claws, for the purpose set forth.

3. The blacksmith's tool consisting of handles A B, link D, catch D', rivet $a$, projection $a'$, segment $b$, teeth $b'$, and claws $b^2$, all made substantially as and for the purpose described.

RECTOR M. THOMPSON.

Witnesses:
JOHN K. GROFF,
ELEVEN C. THOMPSON.